United States Patent [19]

Inoue et al.

[11] Patent Number: 5,578,657
[45] Date of Patent: Nov. 26, 1996

[54] CRT ADHESIVE COMPOSITION AND CRT OBTAINED BY THE USE THEREOF

[75] Inventors: Takuji Inoue, Hasuda; Tsunenari Saito, Tokyo; Kenji Nakayama, Omiya; Hiroe Ito, Yono; Minoru Yokoshima, Toride, all of Japan

[73] Assignees: Sony Corporation; Nippon Kayaku Kabushiki Kaisha, both of Tokyo, Japan

[21] Appl. No.: 438,810

[22] Filed: May 11, 1995

[30] Foreign Application Priority Data

May 17, 1994 [JP] Japan .................................. 6-103024
Nov. 1, 1994 [JP] Japan .................................. 6-269051

[51] Int. Cl.$^6$ ...................................................... C08L 63/10
[52] U.S. Cl. ............................... 522/92; 430/28; 525/502
[58] Field of Search ............................. 522/92; 430/28; 525/502

[56] References Cited

U.S. PATENT DOCUMENTS

| | | | |
|---|---|---|---|
| 3,772,062 | 11/1973 | Shur et al. | 117/93.31 |
| 4,368,300 | 1/1983 | Nakano et al. | 525/531 |
| 4,918,150 | 4/1990 | Sakakibara et al. | 525/502 |
| 4,933,259 | 6/1990 | Chihara et al. | 430/280 |
| 4,943,516 | 7/1990 | Kamayachi et al. | 430/280 |
| 4,948,700 | 8/1990 | Maeda et al. | 430/280 |
| 5,009,982 | 4/1991 | Kamayachi et al. | 430/280 |
| 5,049,628 | 9/1991 | Nawata et al. | 525/502 |
| 5,100,767 | 3/1992 | Yanagawa et al. | 430/280 |
| 5,453,452 | 9/1995 | Nakayama et al. | 522/92 |

FOREIGN PATENT DOCUMENTS

| | | |
|---|---|---|
| 56401/86 | 10/1986 | Australia . |
| 0149867 | 7/1985 | European Pat. Off. . |
| 0306273 | 3/1989 | European Pat. Off. . |
| 0346486 | 12/1989 | European Pat. Off. . |
| 0539606 | 5/1993 | European Pat. Off. . |
| 2508828 | 10/1986 | France . |
| 60-208337 | 10/1985 | Japan . |
| 61-59445 | 3/1986 | Japan . |
| 5178950 | 7/1993 | Japan . |
| 60449174 | 2/1994 | Japan . |
| 2042552 | 9/1980 | United Kingdom . |
| 2272906 | 11/1993 | United Kingdom . |
| 89/07788 | 8/1989 | WIPO . |

OTHER PUBLICATIONS

Examiners Search Report Dated 19 Jul. 1995, GB Application No. GB 9509882.8 (1–page).

European Search Report, Application No. EP 94 10 6930, Search Completed Jul. 29, 1994 (3 pages).

Derwent Abstract Accession No. 88–138039/20, Class A81 E13 G03, JP,A, 63–081187 (IBIDEN CO LTD) 12 Apr. 1988 Abstract.

Derwent Abstract Accession No. 87–097825/14, Class A81 G03, JP,A, 62–045679 (MATSUSHITA ELEC IND KK) 27 Feb. 1987 Abstract.

Derwent Abstract Accession No. 85–317536/51 Class A81 G03, DD,A, 226731 (VEB CARL ZEISS JENA) 28 Aug. 1985 Abstract.

*Primary Examiner*—Mark Chapman
*Attorney, Agent, or Firm*—Nields & Lemack

[57] ABSTRACT

Disclosed herein are adhesive compositions for use in cathode ray tubes comprising a specified epoxy (meth)acrylate, hydroxyl-containing mono (meth)acrylate, a photopolymerization initiator and optionally an urethane (meth)acrylate, the cured products thereof as well as cathode ray tubes obtained by the use thereof. The adhesive compositions of the present invention are excellent in spreadability and the resulting cured products have a good adhesion to glass. Cathode ray tubes in which a sheet of film is bonded to panel-glass by using an adhesive of the present invention exhibit satisfactory screen states comparable to those exhibited by cathode ray tubes subjected to a polishing process.

16 Claims, No Drawings

CRT ADHESIVE COMPOSITION AND CRT OBTAINED BY THE USE THEREOF

TECHNICAL FIELD

The present invention relates to ultraviolet-curing adhesive compositions for use in cathode ray tubes and resulting cured products. More specifically, the present invention relates to adhesive compositions for use in cathode ray tubes intended for televisions and other various displays and resulting cured products. Such adhesive compositions may be suitably used in cathode ray tubes by spreading them over a non-polished surface of panel-glass of cathode ray tubes, bonding a sheet of plastic film thereupon and making them subject to ultraviolet polymerization.

PRIOR ARTS

In recent years, cathode ray tubes (hereinafter also referred to as "CRT"s), particularly color cathode ray tubes intended for televisions and other various displays have been mass-producing. Panel glass of such cathode ray tubes is produced by molding of molten glass materials. Since some irregularities are likely to appear on the surfaces of such panel-glass during molding operation, the molded panel-glass is subjected to surface polishing prior to use.

A polishing process is indispensable for obtaining CRT panel-glass having a desired surface smoothness. In a CRT production process, time and expenses consumed by such polishing process account for 20% to 30% of the total panel cost. In order to meet the need of reducing the CRT production cost, improvement in efficiency of such polishing process is considered an important problem to be solved.

SUMMARY OF THE INVENTION

The present inventors, as a result of their studies for solving the problem set forth above, have found that the panels having a good surface smoothness could be obtained by spreading an adhesive composition over a non-polished surface of CRT panel-glass, bonding a sheet of plastic film thereupon and making the adhesive composition subject to ultraviolet polymerization without the aid of polishing process. Inventors have also discovered an adhesive composition suitable for such use, thus attained the present invention.

The present invention, therefore, relates to an adhesive composition for use in cathode ray tubes and resulting cured product comprising: a bisphenol A-type epoxy (meth)acrylate having a molecular weight of 550 or more and/or an epoxy (meth)acrylate (A) represented by the formula (1):

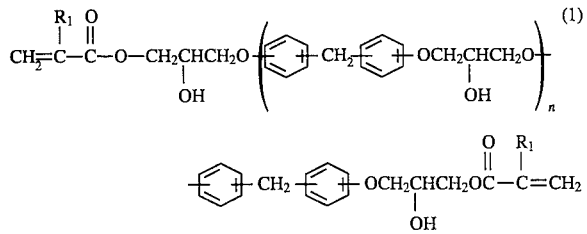

in which, $R_1$ represents a hydrogen atom or $CH_3$; and the average value of n represents a number of 0.5 or more, a hydroxyl-containing mono(meth)acrylate (C) and a photopolymerization initiator (D), optionally together with an urethane (meth)acrylate (B).

The CRT adhesive composition of the present invention exhibits an excellent spreadability over the surface of panel-glass, a fast curing speed and a good adhesion to glass. Further, in the CRT adhesive composition of the present invention, the viscosity and the refractive index after cured may be easily controlled.

DETAILED DESCRIPTION OF THE INVENTION

The present invention will now be described in detail.

Examples of the component (A) used in the present adhesive composition which may be mentioned are: bisphenol A-type epoxy (meth)acrylates (a-1) obtained from the reaction of a bisphenol A-type epoxy resin (e.g., Epikote 1001, 1002, 1003, 1004, 1007, etc., available from Yuka Shell Epoxy Co. Ltd.; NER-7302, etc., available from Nippon Kayaku Co. Ltd. ) with (meth)acrylic acid; or a bisphenol F-type epoxy (meth)acrylates (a-2) obtained from the reaction of bisphenol F-type solid epoxy resin (e.g., Epikote 4001P (epoxy equivalent 470), Epikote 4002P (epoxy equivalent 610, softening point 71° C.), Epikote 4003P (epoxy equivalent 800, softening point 79° C.), Epikote 4004P (epoxy equivalent 930, softening point 85° C.), etc., available from Yuka Shell Epoxy Co. Ltd.) with (meth)acrylic acid.

The epoxy resin is reacted with (meth)acrylic acid in an equivalent ratio of about 0.8 to 1.5, particularly about 0.9 to 1.1 of (meth)acrylic acid to 1 equivalent of epoxy group of epoxy resin. The reaction is conducted in the presence of a diluent selected from photopolymerizable vinyl monomers such as 2-hydroxylethyl (meth)acrylate, (meth)acrylate of phenylglycidyl ether (KARAYAD R-128H, available from Nippon Kayaku Co. Ltd.), 1,4-butanediol mono (meth)acrylate, phenoxyethyl (meth)acrylate and dicyclopentanyl (meth)acrylate. In addition, catalysts may be preferably used as reaction accelerator and such catalysts may be selected from benzyldimethylamine, triethylamine, benzyltrimethylammonium chloride, triphenylstibine and the like. These catalysts are used preferably in an amount of 0.1% to 10% by weight, more preferably 0.3% to 5% by weight based on the reaction mixture. Polymerization inhibitors may also be preferably used for avoiding the polymerization during the reaction and the examples of such polymerization inhibitors are methoquinone, hydroquinone, methylhydroquinone, phenothiazine and the like. These polymerization inhibitors are used preferably in an amount of 0.01% to 1% by weight, more preferably 0.05% to 0.5% by weight based on the reaction mixture. Reaction may be conducted preferably at a temperature of 60° C. to 150° C., more preferably 80° C. to 120° C.

The component (A) may be contained preferably at the content of 5% to 50% by weight, more preferably 10% to 40% by weight in the adhesive composition of the present invention. The component (a-1) having a molecular weight less than 550 tends to result in an insufficient adhesion to glass. Less than 5% by weight of the component (A) may fail to give a satisfactory adhesion to glass, whereas more than 50% by weight of the component (A) would result in an increased viscosity, both of which are not preferable. The CRT adhesive composition of the present invention may optionally contain an urethane (meth)acrylate (B). Examples of urethane (meth)acrylate (B) which may be used are reaction products of three constituents consisting of a polyol, an organic polyisocyanate and a hydroxyl-containing (meth)acrylate. Suitable polyols include ethylene glycol, 1,4-butanediol, neopentyl glycol, polyethylene glycol, polypropylene glycol, polytetramethylene glycol, polyethoxy diol of bisphenol A, polyester polyols (e.g. reaction products of a polyol selected from ethylene glycol, 1,4-butanediol, diethylene glycol, 3-methyl-1,5-pentanediol, neopentyl glycol, etc. with a dibasic acid selected from adipic acid, phthalic acid, isophthalic acid, terephthalic acid, etc.), polye-caprolactone polyol, polybutadiene polyol, polycarbonate polyol and the like. Suitable organic polyisocyanates include tolylene di-isocyanate, xylylene di-isocyanate, isophorone di-isocyanate, hexamethylene di-isocyanate, trimethylhexamethylene di-isocyanate and the like. Suitable hydroxyl-containing (meth)acrylates include 2hydroxyethyl (meth)acrylate, 2-hydroxypropyl (meth)acrylate, 1,4-butanediol mono(meth)acrylate, pentaerythritol tri(meth)acrylate and the like.

The component (B) may be contained preferably at the content of 0% to 50% by weight, more preferably 0% to 30% by weight in the CRT adhesive composition of the present invention. More than 50% by weight of the component (B) is not preferred, since the obtained adhesive composition may fail to give a satisfactory adhesion to glass and would result in an increased viscosity.

The CRT adhesive composition of the present invention further contains a hydroxyl-containing mono(meth)acrylate (C). Examples of the component (C) are 2-hydroxy-3-phenyloxypropyl (meth)acrylate (such as KAYARAD R-128H available from Nippon Kayaku Co. Ltd.), 2-hydroxyethyl (meth)acrylate, 2-hydroxypropyl (meth)acrylate, 1,4-butanediol mono (meth)acrylate, glycerin mono (meth)acrylate and the like, among which 2-hydroxy-3-phenyloxy-propylene acrylate and 2-hydroxyethyl methacrylate are particularly preferred. Component (C) may contained preferably at the content of 40% to 90% by weight, more preferably 60% to 80% by weight in the CRT adhesive composition of the present invention. More than 40% by weight of the component (C) may result in an increased viscosity and an insufficient adhesion to glass, thus such content is not preferable. More than 90% by weight of the component (C) may result in a decreased viscosity leading to the worse spreadability, thus is not preferable.

Any known photopolymerization initiators may be used as photopolymerization initiator (D), including 2-hydroxy-2methylpropiophenone, 4'-isopropyl-2-hydroxy-2-methylpropiophenone, benzyldimethylketal, 1-hydroxycyclohexylphenylketone, benzophenone, 2-methyl-1- [4-(methylthio)-phenyl]2-morpholinopropanone-1,2,4,6-trimethylbenzoyl-diphenylphosphineoxide. These photopolymerization initiators may be used in combination with accelerators such as tertiary amines. Photopolymerization initiators may be contained preferably at the content of 0.5% to 15% by weight, more preferably 1% to 7% by weight in the CRT adhesive composition of the present invention.

Examples of photopolymerization initiators which may be preferably used are 1-hydroxycyclohexylphenylketone, 2-hydroxy-2-methylpropiophenone and the like. Accelerators such as tertiary amines which may be mentioned are 2-dimethylaminoethyl benzoate, dimethylaminoacetophenone, 4-dimethylamino ethylbenzoate, 4-dimethylamino isoamylbenzoate. The content of such accelerators is preferably 0 to 100 parts by weight on the basis of 100 parts by weight of photopolymerization initiators.

The CRT adhesive composition of the present invention may be obtained by heating the above components (A), (B), (C) and (D), mixing them together and dissolving them. In the CRT adhesive composition of the present invention, the weight proportion of the components may preferably be controlled so that the resulting cured product have a 25° C. refractive index of 1.520 to 1.550, more preferably 1.530 to 1.540. CRT panel-glass of cathode ray tubes has generally a 25° C. refractive index of 1.536. An increased difference between the refractive index of the panel-glass and that of the cured product of the CRT adhesive composition of the present invention may give rise to reflection at the interface between surface defects of the panel-glass and the cured adhesive composition, thus making the defects disadvantageously distinguish. It is preferable to control the 25° C. viscosity of the CRT adhesive composition of the present invention, by regulating the proportion of each component so that the obtained adhesive composition may attain the final viscosity of 1,000 to 3,000 cps (25° C.), thus allowing a better spreadability.

In a preferred embodiment of the present invention, a CRT adhesive composition comprises an epoxy (meth)acrylate (A) of the general formula (1), a hydroxyl-containing mono(meth)acrylate (C), a photopolymerization initiator (D) and optionally an urethane (meth)acrylate (B). Another preferred embodiment comprises a bisphenol A-type epoxy (meth)acrylate (A), a hydroxyl-containing mono-(meth)acrylate (C), a photopolymerization initiator (D) and optionally an urethane (meth)acrylate (B).

Although the above components could be enough to obtain the expected CRT adhesive composition of the present invention, other constituents may be added thereto for improving or optimizing the performance thereof. Such other constituents should be used within the range that may not cause any alteration in the essential properties of the final product. These other constituents are: ethylenicaly unsaturated group-containing compounds other than components (A), (B) and (C) (such as Carbitol (meth)acrylate, tetrahydrofurfuryl (meth)acrylate, phenoxyethyl acrylate, acryloyl morpholine, dicyclo-pentenyl (meth)acrylate, dicyclopentadieneoxyethyl (meth)acrylate, tripropylene glycol di(meth)acrylate, neopentyl glycol di(meth)acrylate, tricyclodecane di (meth)acrylate, nonandiol di(meth)acrylate, isobornyl (meth)acrylate, trimethylolpropane tri(meth)acrylate, polyester poly (meth)acrylates, polycarbonate poly-(meth)acrylates and novolak-type epoxy (meth)acrylates); non-reactive compounds (such as acryl polymers, polyvinyl chlorides, petroleum resins and styrene polymers); antifoaming agents; leveling agents; antistatic agents; flame-retardants; antioxidants; light stabilizers; ultraviolet light absorbers; coupling agents; polymerization inhibitors and the like.

The cured product of the CRT adhesive composition of the present invention may be obtained by subjecting the latter to ultraviolet-light irradiation.

The CRT adhesive compositon of the present invention is spread by means of an automatic dropping spreader over a non-polished surface of CRT panel-glass so that a coating thickness of 20 μm to 200 μm may be obtained after cured. Then, a sheet of film (selected from commercially available plastic films including: polyester film of 50 μm to 300 μm thick having one hard-coated face and the opposite primer-coated face to provide an excellent adhesion with an adhesive composition; polyurethane film; polycarbonate film; or functional film treated to have a decreased reflection) is bonded thereonto and then the adhesive composition is made to cure by irradiating ultraviolet light on the side of the film, so that CRT panel-glass with a sheet of film may be obtained.

CRT panel-glass having a sheet of film bonded by using a CRT adhesive composition of the present invention possesses an excellent surface smoothness without subjected to polishing process, and therefore is comparable in performance to that which had been subjected to polishing process. Such bonding process without polishing may be performed much more briefly and readily than polishing process, thus allowing to largely reduce the CRT production cost.

EXAMPLES

The present invention will be described in more detail by way of the following examples and comparative examples.

(Synthesis of components (A))

Synthesis Example 1

930 parts of bisphenol F-type solid epoxy resin (Epikote 4004P; epoxy equivalent 930; softening point 85° C.; available from Yuka Shell Epoxy Co. Ltd.), 71.3 parts of acrylic acid, 0.5 part of methoquinone and 1007.8 parts of phenyl glycidyl ether acrylate (KAYARAD R-128H available from Nippon Kayaku Co. Ltd.) acting as diluent were charged together and heated to 90° C. to dissolve the solid epoxy resin. After the complete dissolution, the mixture was allowed to cool to 60° C., then 6.0 parts of triphenyl phosphine was charged and heated up to 95° C. at which temperature the reaction was continued for 30 hours to obtain an epoxy acrylate (a-2-1) containing 50% by weight of phenyl glycidyl ether acrylate. The obtained product had a viscosity of 260 poises measured at 60° C.

Synthesis Example 2

470 parts of bisphenol F-type solid epoxy resin (Epikote 4001P; epoxy equivalent 470; available from Yuka Shell Epoxy Co. Ltd.), 71.3 parts of acrylic acid, 0.5 part of methoquinone and 545 parts of phenyl glycidyl ether acrylate were charged together and heated to 90° C. to dissolve the solid epoxy resin. After the complete dissolution, the mixture was allowed to cool to 60° C. then 3.2 parts of triphenyl phosphine was charged and heated up to 95° C., at which temperature the reaction was continued for 30 hours to obtain an epoxy acrylate (a-2-2) containing 50% by weight of phenyl glycidyl ether acrylate. The obtained product had a viscosity of 44.5 poises measured at 60° C.

Examples 1 to 4, Comparative examples 1 to 7

In each of these examples, a CRT adhesive composition was prepared by heat-dissolving a starting mixture in accordance with each of the formulations shown in Tables 1 and 2 (amounts represent % by weight). The obtained CRT adhesive composition was spread over a non-polished surface of CRT panel-glass (having a refractive index of 1.536 measured at 25° C.) by means of an automatic dropping spreader so that a coating thickness of 50 μm may be obtained after cured. A sheet of polyester film (available from Teijin Co. Ltd.; of which one face was hard-coated and the opposite face was primer-coated for improving adhesion to an adhesive composition; film thickness of 188 μm) was placed over the adhesive composition so that the primer-coated face may be bonded to the glass surface. Then, by means of a 2 kw high-pressure mercury vapor lamp, ultraviolet light was irradiated on the side of the polyester film for making the adhesive composition cure to obtain a cathode ray tube with the sheet of polyester film.

For the performance assessment of each adhesive composition, the viscosity measured at 25° C. (cps), the spreadability, the adhesion, the refractive index of cured products measured at 25° C. and the screen states were determined by testing.

Testing method:

Viscosity at 25° C. (cps): was measured by means of an E-type viscometer.

Spreadability: was determined by testing application properties by means of an automatic spreader:

O . . . good;

X . . . bad;

Δ . . . intermediate between O and X

Adhesion: Adhesive strength (kg/cm) was tested as follows: A test piece of panel-glass was prepared by spreading an adhesive composition, bonding a sheet of polyester film thereupon and irradiating ultraviolet light to cure the adhesive composition, as described above. The prepared test piece of panel-glass was subjected to peeling test, according to which the sheet of polyester film was cut to 1 inch wide and peeled by pulling up to 90 degrees (pulling rate of 2 inches/min.).

Refractive index of the cured product (25° C.): was tested as follows: Each adhesive composition was spread on a tin-free steel plate to a coating thickness of 100 μm, then ultraviolet light was irradiated thereonto in the presence of gaseous $N_2$, then the cured product was peeled off from the steel plate, and thereafter the refractive index at 25° C. was measured.

Screen states: A television was assembled by using CRT panel-glass which had been prepared by spreading an adhesive composition, bonding a sheet of polyester film thereupon and irradiating ultraviolet light to cure the adhesive composition, as described above. Screen states of the obtained television were observed:

O . . . Nothing wrong was observed on the television screen;

X . . . Defects were made prominent as a result of the reflection occurred at the interface between the cured adhesive composition and the glass surface of the television screen.

TABLE 1

| | Examples | | | |
|---|---|---|---|---|
| | 1 | 2 | 3 | 4 |
| KAYARAD R-310*[1] | 24 | 40 | 30 | 24 |
| KAYARAD R-114*[2] | | | | |
| KAYARAD UX-3204*[3] | 17 | | 20 | |
| KAYARAD UX-4101*[4] | | | | 17 |
| KAYARAD R-128H*[5] | 35 | 30 | 20 | 35 |
| 2-hydroxyethylmethylacrylate | 24 | | | 24 |

TABLE 1-continued

|  | Examples | | | |
|---|---|---|---|---|
|  | 1 | 2 | 3 | 4 |
| 2-hydroxypropylmethacrylate |  |  | 15 |  |
| 2-hydroxyethylacrylate |  | 30 | 15 |  |
| Carbitolacrylate |  |  |  |  |
| phenoxyethylacrylate |  |  |  |  |
| 1,6-hexanedioldiacrylate |  |  |  |  |
| Irgacure 184*[6] | 3 | 3 | 3 | 3 |
| others: Mark LA-82*[7] | 1 | 1 | 1 | 1 |
| :hydroquinone methylether (polymerization inhibitor) | 0.05 | 0.05 | 0.05 | 0.05 |
| viscosity (25° C., cps) | 1750 | 1420 | 2560 | 1840 |
| spreadability | ○ | ○ | ○ | ○ |
| adhesion (kg/cm) | 1.8 | 1.6 | 1.4 | 1.7 |
| refractive index of cured product (25° C.) | 1.540 | 1.544 | 1.535 | 1.539 |
| screen states | ○ | ○ | ○ | ○ |

TABLE 2

|  | Comparative examples | | | | | | |
|---|---|---|---|---|---|---|---|
|  | 1 | 2 | 3 | 4 | 5 | 6 | 7 |
| KAYARAD R-310*[1] |  | 24 |  | 25 | 20 | 30 | 25 |
| KAYARAD R-114*[2] | 19 |  |  |  |  |  |  |
| KAYARAD UX-3204*[3] | 17 | 17 |  |  | 25 | 25 |  |
| KAYARAD UX-4101*[4] |  |  | 29 |  |  |  | 15 |
| KAYARAD R-128H*[5] | 47 |  | 47 | 75 |  | 20 | 35 |
| 2-hydroxyethylmethylacrylate | 17 |  | 24 |  |  | 25 |  |
| 2-hydroxypropylmethacrylate |  |  |  |  |  |  |  |
| 2-hydroxyethylacrylate |  |  |  |  | 55 |  | 15 |
| Carbitolacrylate |  | 24 |  |  |  |  |  |
| phenoxyethylacrylate |  | 35 |  |  |  |  |  |
| 1,6-hexanedioldiacrylate |  |  |  |  |  |  | 10 |
| Irgacure 184*[6] | 3 | 3 | 3 | 3 | 3 | 3 | 3 |
| others: Mark LA-82*[7] | 1 | 1 | 1 | 1 | 1 | 1 | 1 |
| :hydroquinone methylether (polymerization inhibitor) | 0.05 | 0.05 | 0.05 | 0.05 | 0.05 | 0.05 | 0.05 |
| viscosity (25° C., cps) | 1510 | 540 | 2350 | 2269 | 1100 | 3830 | 1670 |
| spreadability | ○ | x | ○ | ○ | ○ | x | ○ |
| adhesion (kg/cm) | 0.2 | 0.5 | 0.2 | 1.6 | 1.2 | 1.4 | 0.1 |
| refractive index of cured product (25° C.) | 1.541 | 1.535 | 1.521 | 1.562 | 1.501 | 1.538 | 1.530 |
| screen states | ○ | ○ | ○ | x | x | ○ | ○ |

Notes
*[1]KAYARAD R-310: product of Nippon Kayaku Co. Ltd.; Epikote 1004 (bisphenol A-type epoxy resin; epoxy equivalent of 930; softening point of 98° C.; available from Yuka Shell Epoxy Co. Ltd.) was reacted with acrylic acid, then the obtained reaction product (average molecular weight of 2004) was diluted in 50% by weight of 2-hydroxy-3-phenyloxy-propylacrylate (KAYARAD R-128H).
*[2]KAYARAD R-114: product of Nippon Kayaku Co. Ltd.; the reaction product (average molecular weight of 512) of Epikote 828 (bisphenol A-type epoxy resin; epoxy equivalent of 184; liquid; available from Yuka Shell Epoxy Co. Ltd.) with acrylic acid
*[3]KAYARAD UX-3024: available from Nippon Kayaku Co. Ltd.; polyester-type non-yellowing urethane acrylate
*[4]KAYARAD UX-4101: available from Nippom Kayaku Co. Ltd.; polyester-type non-yellowing urethane acrylate
*[5]KAYARAD R-128H: available from Nippon Kayaku Co. Ltd.; 2-hydroxy-3-phenyloxy-propylacrylate
*[6]Irgacure-184: available from Ciba-Geigy Co. Ltd.; photopolymerization initiator; 1-hydroxycyclohelyl-phenylketone
*[7]MARAK LA-82: available from Asahi Denka Koygo Co. Ltd.; photo stabilizer As can be obvious from the results shown in Table 1, each of the CRT adhesive compositions of the present invention was excellent in both spreadability and adhesion, and also satisfactory in all respects about the screen states of a television.

Examples 5 to 8, Comparative Examples 8 to 10

In each of these examples, a CRT adhesive composition was prepared by heat-dissolving a starting mixture in accordance with each of the formulations shown in Tables 3 and 4 (amounts represent % by weight). The obtained CRT adhesive compositon was spread over a non-polished surface of CRT panel-glass (having a refractive index of 1.536 measured at 25° C.) by means of a roll coater so that a coating thickness of 70 μm may be obtained after cured. A sheet of polyester film (of which one face was hard-coated and the opposite face was primer-coated for improving adhesion to an adhesive; film thickness of 200 μm) was placed over the adhesive composition so that the primer-coated face may be bonded to the glass surface. Then, by means of a 2 kw high-pressure mercury vapor lamp, ultraviolet light was irradiated on the side of the polyester film for making the adhesive composition cure to obtain a cathode ray tube with the sheet of polyester film.

For the performance assessment of each adhesive composition, the adhesion, the refractive index of cured product measured at 25° C. and the screen states were determined by testing.

Testing method:

Adhesion: Adhesive strength (kg/cm) was tested as follows: A test piece of panel-glass was prepared by spreading an adhesive composition, bonding a sheet of polyester film thereupon and irradiating ultraviolet light to cure the adhesive composition, as described above. The prepared test piece of panel-glass was subjected to peeling test, according to which the sheet of polyester film was cut to 1 inch wide and peeled by pulling up to 90 degrees (pulling rate of 2 inches/min.).

Refractive index of the cured product (25° C.): was tested as follows: Each adhesive composition was spread on a tin-free steel plate to a coating thickness of 100 μm, then ultraviolet light was irradiated thereonto in the presence of gaseous $N_2$, then the cured product was peeled off from the steel plate, and thereafter the refractive index at 25° C. was measured.

Screen states: A television was assembled by using CRT panel-glass which had been prepared by spreading an adhesive composition, bonding a sheet of polyester film thereupon and irradiating ultraviolet light to cure the adhesive composition, as described above. Screen states of the obtained television were observed:

O . . . Nothing wrong was observed on the television screen;

X . . . Defects were made prominent as a result of the reflection occurred at the interface between the cured adhesive composition and the glass surface of the television screen.

TABLE 3

| Formulation | Examples | | | |
|---|---|---|---|---|
| | 5 | 6 | 7 | 8 |
| epoxyacrylate (a-2-1) of Synthesis 1 | 24 | | 30 | 24 |
| epoxyacrylate (a-2-2) of Synthesis 2 | | 40 | | |
| KAYARAD UX-3204*[1] | 17 | | 20 | |
| KAYARAD UX-4101*[2] | | | | 17 |
| KAYARAD 128H*[3] | 35 | 30 | 20 | 35 |
| 2-hydroxyethylmethacrylate | 24 | | | 24 |
| 2-hydroxypropylmethacrylate | | | 15 | |
| 2-hydroxyethylacrylate | | 30 | 15 | |
| Irgacure 184*[4] | 3 | 3 | 3 | 3 |
| MARK LA-82*[5] | 1 | 1 | 1 | 1 |
| hydroquinone methylether | 0.05 | 0.05 | 0.05 | 0.05 |
| Performance | | | | |
| adhesion (kg/cm) | 2.0 | 1.8 | 1.7 | 1.9 |
| refractive index of cured product (25° C.) | 1.545 | 1.547 | 1.540 | 1.543 |
| screen states | o | o | o | o |

TABLE 4

| Formulation | Comparative examples | | |
|---|---|---|---|
| | 8 | 9 | 10 |
| epoxyacrylate (a-2-1) of Synthesis 1 | 24 | | |
| KAYARAD UX-3204*[1] | 17 | | 20 |
| KAYARAD UX-4101*[2] | | 29 | 25 |
| KAYARAD 128H*[3] | | 47 | |
| 2-hydroxyethylmethacrylate | | 24 | |

TABLE 4-continued

| Formulation | Comparative examples | | |
|---|---|---|---|
| | 8 | 9 | 10 |
| 2-hydroxyethylacrylate | | | 55 |
| Carbitolacrylate | 24 | | |
| phenoxyethylacrylate | 35 | | |
| Irgacure 184*[4] | 3 | 3 | |
| MARK LA-82*[5] | 1 | 1 | |
| hydroquinone methylether | 0.05 | 0.05 | |
| Performance | | | |
| adhesion (kg/cm) | 0.5 | 0.2 | 0.1 |
| refractive index of cured procuct (25° C.) | 1.540 | 1.521 | 1.490 |
| screen states | o | o | x |

Notes
*[1]KAYARAD UX-3204: available from Nippon Kayaku Co. Ltd.; polyester-type non-yellowing urethane acrylate
*[2]KAYARAD UX-4101: available from Nippon Kayaku Co. Ltd.; polyester-type non-yellowing urethane acrylate
*[3]KAYARAD R-128H: available from Nippon Kayaku Co. Ltd.; 2-hydroxy-3-phenyloxy-propylacrylate
*[4]Irgacure-184: available from Ciba-Geigy Co. Ltd.; photopolymerization initiator; 1-hydroxycyclohexyl-phenylketone
*[5]MARK LA-82: available from Asahi Denk Kogyo Co. Ltd.; photo stabilizer As can be obvious from the results shown in Tables 3 and 4, each of the CRT adhesive compositions of the present invention was excellent in adhesion and satisfactory in all respects about the screen states of a television.

Effects of the Invention

The adhesive compositions for use in cathode ray tubes of the present invention are excellent in spreadability and the resulting cured products have a good adhesion to glass. Cathode ray tubes in which a sheet of film is bonded to panel-glass by means of the adhesive composition of the present invention exhibit satisfactory screen states comparable to those exhibited by cathode ray tubes subjected to a polishing process. Bonding a sheet of film to panel-glass by using an adhesive composition of the present invention is much more efficient than a process of polishing panel-glass, and thus it has become possible to largely reduce the production cost of a cathode ray tube.

What is claimed is:

1. An adhesive composition for use in cathode ray tubes comprising: a bisphenol A epoxy (meth)acrylate which is obtained by reacting a bisphenol A epoxy resin with (meth)acrylic acid and has a molecular weight of 550 or more and/or an epoxy (meth)acrylate (A) represented by the formula (1):

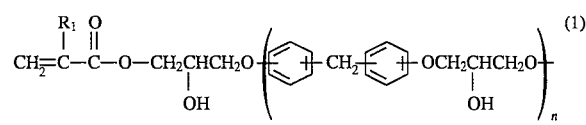

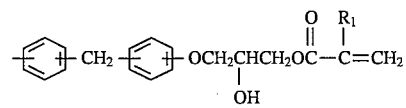

in which, $R_1$ represents a hydrogen atom or $CH_3$; and the average value of n represents a number of 0.5 or more, a hydroxyl-containing mono(meth)acrylate (C) and a photopolymerization initiator (D), optionally together with a urethane (meth)acrylate (B).

2. An adhesive composition for use in cathode ray tubes comprising: an epoxy (meth)acrylate (A) represented by the formula (1):

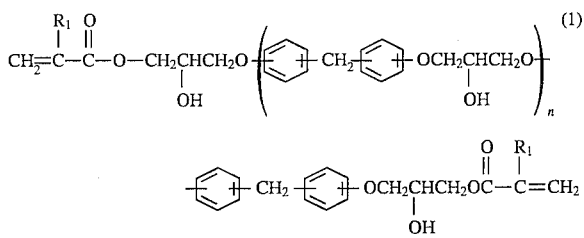

in which, $R_1$ represents a hydrogen atom or $CH_3$; and the average value of n represents a number of 0.5 or more, a hydroxyl-containing mono(meth)acrylate (C), a photopolymerization initiator (D) and an urethane (meth)acrylate (B).

3. An adhesive composition for use in cathode ray tubes comprising: a bisphenol A epoxy (meth)acrylate which is obtained by reacting a bisphenol A epoxy resin with (meth)acrylic acid and has a molecular weight of 550 or more, a hydroxyl-containing mono(meth)acrylate (C), a photopolymerization initiator (D) and a urethane (meth)acrylate (B).

4. An adhesive composition for use in cathode ray tubes comprising: an epoxy (meth)acrylate (A) represented by the formula (1):

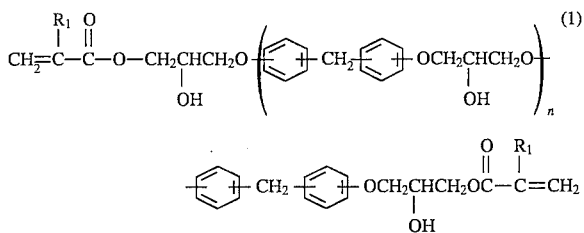

in which, $R_1$ represents a hydrogen atom or $CH_3$; and the average value n represents a number of 0.5 or more, a hydroxyl-containing mono(meth)acrylate (C) and a photopolymerization initiator (D).

5. An adhesive composition for use in cathode ray tubes comprising: a bisphenol A epoxy (meth)acrylate which is obtained by reacting a bisphenol A epoxy resin with (meth)acrylic acid and has a molecular weight of 550 or more, a hydroxyl-containing mono(meth)acrylate (C) and a photopolymerization initiator (D).

6. The adhesive compositon for use in cathode ray tube according to any one of the claims 1 to 5, characterized in that said adhesive has a 25° C. refractive index of 1.520 to 1.550 after cured.

7. A cured product of the adhesive composition for use in cathode ray tubes according to claim 6.

8. A cathode ray tube in which a sheet of film is bonded to panel-glass by using the adhesive composition according to claim 7.

9. A cathode ray tube according to claim 8 wherein the sheet of film is polyester film.

10. A cathode ray tube in which a sheet of film is bonded to panel-glass by using the adhesive composition according to claim 6.

11. A cathode ray tube according to claim 10 wherein the sheet of film is polyester film.

12. A cured product of the adhesive composition for use in cathode ray tubes according to any one of the claims 1 to 5.

13. A cathode ray tube in which a sheet of film is bonded to panel-glass by using the adhesive composition according to claim 12.

14. A cathode ray tube according to claim 13 wherein the sheet of film is polyester film.

15. A cathode ray tube in which a sheet of film is bonded to panel-glass by using the adhesive composition according to any one of the claims 1 to 5.

16. The cathode ray tube according to claim 15 wherein the sheet of film is polyester film.

* * * * *